Patented Aug. 5, 1941

2,251,692

UNITED STATES PATENT OFFICE 2,251,692

PREPARATION OF MONOGLYCERIDES

Albert S. Richardson, Wyoming, Ohio, assignor to The Procter & Gamble Company, Cincinnati, Ohio, a corporation of Ohio No Drawing. Application March 23, 1939, Serial No. 263,707

10 Claims. (Cl. 260—411)

The present invention relates to the preparation of higher molecular weight fatty acid mono esters of glycerol.

The object of the invention is to produce at relatively low temperatures products rich in their content of higher fatty acid monoglyceride.

Monoglycerides of the higher fatty acids are becoming increasingly important technically because of their power to decrease the interfacial tension at an oil-water interface. The power to so alter the interfacial tension makes them valuable as emulsifying agents. Therefore, there has been increasing need for an economical, easily operated process for preparing monoglycerides of light color and nearly free of di- and triglycerides which possess distinctly lower emulsifying power.

In the preparation of fatty acid monoglycerides by the simple esterification of glycerin with higher molecular weight fatty acids in the manner heretofore practiced, a properly proportioned mixture of glycerol and higher fatty acid is stirred and heated under a blanket of inert gas to a reaction temperature of 200–250° C. and held at that temperature for four or five hours or until esterification is substantially complete. Such high temperatures of reaction are in many instances detrimental to color, and tend to cause thermal decomposition, formation of undesired by-products, loss of material, and general impairment of quality, and these disadvantages are even more pronounced when an ordinary type of esterification catalyst such as sulfuric acid is employed. Furthermore, a relatively low yield of the desired monoglyceride results, products obtained from such a method containing a large proportion, sometimes as high as fifty per cent, of di- and triglycerides despite efforts to favor the formation of the monoglyceride by the employment of large excesses of glycerol.

My invention, which I believe satisfactorily accomplishes the above object and which is especially applicable in the preparation of monoglycerides from unsaturated fatty acids and other products lacking in stability at high temperature, consists in the reaction of a higher fatty acid and glycerol in suitable proportions in the presence of boiling dioxane and an esterification catalyst. Since the boiling point of pure dioxane is about 101° C. the boiling point of the reaction mixture and therefore the reaction temperature in my process usually lies in the range of about 102° to about 115° C.

In carrying out my improved process I bring together in a suitable reaction vessel higher fatty acid and glycerol in proper proportion, a suitable amount of dioxane and a small amount of esterification catalyst. For maximum conversion of fatty acid to monoglyceride, the amount of glycerol should be in excess of that used up in the process, usually in the proportion of 2 or more mols of glycerol to one of fatty acid, and the amount of dioxane should be sufficient to act as a common solvent for the excess of glycerol and the monoglyceride formed in the process and yield a mixture which boils at a relatively low temperature. The mixture is agitated and heated to boiling temperature at which stage esterification gradually occurs between the acid and the glycerol. Boiling is continued until the reaction has reached substantial completion as evidenced, for example, by no further reduction in fatty acid content of the boiling mixture.

My invention will be more clearly understood from the following example in which I describe the preparation of a product rich in a mixture of monoglycerides of stearic and palmitic acids, it being understood of course that the specific limitations are by way of example only and that the scope of the invention is not to be limited thereto but rather by the breadth of the appended claims.

*Example.*—A mixture of 30 parts commercial triple pressed stearic acid (containing about 55% palmitic acid and about 45% stearic acid), 40 parts glycerol, 200 parts dioxane and 0.2 part sulfuric acid is agitated and boiled under a reflux condenser for about 3 hours. The temperature of the boiling mixture will be in the neighborhood of 107° C. The condensed vapors are passed over an agent such as calcium chloride or a product commercially known as "Dryerite" which is capable of absorbing water of esterification from the condensed vapors before the dioxane is returned to the reaction zone. After the 3-hour boiling period has elapsed, the reaction has reached substantial completion and the mixture is treated with a small amount of alkali sufficient to neutralize the acid catalyst, following which the dioxane is distilled out with the aid of a slow stream of inert gas, such as nitrogen, under partial vacuum with the temperature held at 90–100° C. Most of the dioxane is thus recovered and the residue is then heated under a 28–30 inch vacuum at a temperature of about 120° C. for about 30 minutes in order to substantially completely remove the last portion of dioxane. A mixture consisting mainly of monoglyceride and excess glycerin is thereby obtained. Most of the excess glycerin may be separated from the monoglyceride by gravity, or if a somewhat purer product free from dissolved glycerin is desired the excess glycerin may be removed by water washing. If an even purer product free from catalyst as well as excess glycerin is desired, the reaction mixture may be mixed with a dilute aqueous alkaline solution which is then treated with portions of a fat solvent such as ethyl ether, to extract the glycerides. The combined ether extractions may then be washed with water for purification and the monoglyceride recovered from the ether in a known manner.

A product prepared in accordance with the above example and isolated by ether extraction as indicated contained about nine per cent free fatty acid and ninety-one percent esterified fatty acid, of which about ninety per cent was monoglyceride as judged from the saponification and hydroxyl numbers of the product. The monoglyceride thus prepared was also extremely light in color and possessed superior surface activity as compared to the product prepared by simple esterification.

As will be observed from the above example, I provide for removal of water from the condensed vapors before the same are returned to the reaction zone. However, it is possible to carry on the reaction without taking special precautions as regards water removal but obviously under such conditions a reaction equilibrium may be reached before the fatty acid and glycerol have been substantially completely converted into monoglyceride. Thus the efficiency or completeness of conversion will depend to a large extent on the completeness with which the water of reaction is removed from the reaction zone.

In carrying out my improved process, the proportion of fatty acid to glycerol is not critical, but of course it is essential to have at least one molar proportion of glycerol for each molar proportion of fatty acid. Since a larger proportion of glycerol forces the reaction in the direction of monoglyceride formation, I prefer to employ such an excess and normally carry out the reaction with two to four molar proportions of glycerol for each molar proportion of fatty acid. Proportions of glycerol in excess of the maximum of the preferred range may be employed without detrimental effect, but I have found no particular advantage in the use thereof.

The amount of dioxane which may be employed in the practice of my invention is not sharply critical but of course it does have some effect on the rate at which the esterification takes place and on the temperature at which the dioxane boils, larger proportions resulting in lower reaction temperatures and favoring the equilibrium I desire. I have obtained satisfactory results using an amount of dioxane equal to the combined weight of the glycerol and the fatty acid, but lesser amounts may be employed with distinct advantage over processes involving simple esterification. The preferred amount of dioxane is one which will give a substantially homogeneous solution at the temperature of reaction and more definitely, my preferred range is from two to four times the combined weight of glycerol and fatty acid. The maximum amount is unlimited and is controlled mainly by economic and practical considerations. In all cases the temperature of reaction is the boiling point of the mixture of fatty acid, glycerol, dioxane, and catalyst, and under nearly all practical conditions this temperature will be below 120° C.

The higher fatty acids which are employed to form the most useful products of my invention are those saturated and unsaturated aliphatic acids containing eight or more carbon atoms in the molecule, such as lauric, palmitic, stearic, oleic, linolic, etc. Mixed fatty acids derived from natural fats, oils and waxes such as coconut oil, tallow, soybean oil, cottonseed oil, sperm oil, etc., and from the saturated or partially saturated hydrogenation products may also be employed to advantage. Synthetic fatty acids such as those obtained by the oxidation of paraffin may likewise be used if desired, fractions having saponification numbers falling within the range of 190–270 being especially useful. A particularly useful product, for example, which is somewhat loosely designated as "monostearin" may be prepared from a commercially available mixture of palmitic and stearic acid commonly referred to as "commercial stearic acid." (See example.)

The catalysts which may be used in the practice of my invention form a well known group of compounds commonly referred to as "esterification catalysts" and including substances such as sulfuric acid and aromatic sulfonic acids well known as Twitchell reagents or hydrolyzing catalysts. The quantity required for satisfactory operation of the invention is small, being usually about 0.05 per cent to one per cent of the combined weight of glycerol and fatty acid as calculated in terms of sulfuric acid or its chemical equivalent of the acid used. As indicated in the example given above, the catalyst may be neutralized or removed by washing after the reaction is completed, if desired.

The advantages of my improved process over prior practice may be summarized as follows:

1. High concentration of monoglyceride in the reaction product.

2. Low reaction temperatures favoring formation of products light in color and free of undesirable by-products.

3. Easy separation and recovery of the reaction medium from the reaction product.

Having thus described my invention, what I claim and desire to secure by Letters Patent is:

1. The process of esterifying glycerol with a fatty acid having eight or more carbon atoms per molecule to form a product rich in fatty acid monoglyceride, which comprises mixing one molar proportion of said fatty acid with at least one molar proportion of glycerol in the presence of boiling dioxane and an esterification catalyst.

2. The process of esterifying glycerol with a fatty acid having eight or more carbon atoms per molecule to form a product rich in fatty acid monoglyceride, which comprises mixing one molar proportion of said fatty acid with approximately four molar proportions of glycerol in the presence of boiling dioxane and an esterification catalyst.

3. The process of esterifying glycerol with a fatty acid having eight of more carbon atoms per molecule to form a product rich in fatty acid monoglyceride, which comprises mixing at boiling temperature one molar proportion of said fatty acid with at least one molar proportion of glycerol in the presence of an esterification catalyst and an amount of dioxane which is equal to at least twice the combined weight of the fatty acid and glycerol.

4. The process of forming an esterification product rich in fatty acid monoglyceride, which comprises boiling a mixture of glycerol and a fatty acid having eight or more carbon atoms in relative proportion favoring the formation of monoglyceride, dioxane, and an esterification catalyst and refluxing the dioxane.

5. The process of forming an esterification product rich in fatty acid monoglyceride, which comprises boiling a mixture of glycerol and a fatty acid having eight or more carbon atoms in relative proportion favoring the formation of monoglyceride, dioxane, and an esterification catalyst, refluxing the dioxane until the desired reaction is obtained, subsequently neutralizing the esterification catalyst and separating the dioxane from the reaction product.

6. The process of forming an esterification product rich in fatty acid monoglyceride, which comprises boiling a mixture of glycerol, a fatty acid having eight or more carbon atoms, dioxane, and an esterification catalyst, and refluxing the dioxane over a water absorbing agent until the desired reaction has taken place, the fatty acid and glycerol being in proportion favoring the formation of the monoglyceride ester.

7. The process of esterifying glycerol with a fatty acid having eight or more carbon atoms per molecule at a temperature less than 120° C. to form a light colored product rich in fatty acid monoglyceride, which comprises mixing one molar proportion of said fatty acid with from two to four molar proportions of glycerol in the presence of boiling dioxane and an esterification catalyst.

8. The process of forming an esterification product rich in monostearin which comprises boiling a mixture of about four molar proportions of glycerol, about one molar proportion of stearic acid, an esterification catalyst and an amount of dioxane equal to at least twice the combined weight of the fatty acid and glycerol, refluxing the dioxane over a water absorbing agent until the desired reaction has taken place, subsequently neutralizing the esterification catalyst and separating the dioxane from the reaction product.

9. The process of esterifying glycerol with a fatty acid having eight or more carbon atoms per molecule to form monoglyceride which comprises boiling a mixture of fatty acid, glycerol and dioxane.

10. The process of esterifying glycerol with a fatty acid having eight or more carbon atoms per molecule to form monoglyceride which comprises boiling a mixture of fatty acid, glycerol and dioxane, the said mixture boiling at a temperature greater than 101° C. but less than 120° C.

ALBERT S. RICHARDSON.